United States Patent [19]

Baverstock

[11] Patent Number: 5,146,903

[45] Date of Patent: Sep. 15, 1992

[54] LOW HEIGHT LIQUID FUEL LOCK AND CONVERTER TO THE GASEOUS PHASE

[75] Inventor: Richard Baverstock, Long Beach, Calif.

[73] Assignee: OHG, Inc., Santa Fe Springs, Calif.

[21] Appl. No.: 781,311

[22] Filed: Oct. 25, 1991

[51] Int. Cl.$^5$ ............................................. F02M 21/06
[52] U.S. Cl. .................................. 123/527; 123/525; 48/184
[58] Field of Search .................. 123/525, 527; 48/192, 48/193, 184; 62/50.2

[56] References Cited

U.S. PATENT DOCUMENTS

| | | | |
|---|---|---|---|
| 2,248,228 | 7/1941 | Ensign | 48/184 |
| 2,775,981 | 1/1957 | Zonker | 48/184 |
| 3,184,295 | 5/1965 | Baverstock | 123/525 |
| 3,545,948 | 12/1970 | Baverstock | 48/184 |
| 4,020,810 | 5/1977 | Baverstock | 48/184 |
| 4,325,343 | 4/1982 | Turner | 123/527 |
| 4,347,824 | 9/1982 | Pierson | 123/527 |
| 4,369,751 | 1/1983 | Batchelar et al. | 123/525 |
| 4,413,607 | 11/1983 | Batchelor et al. | 123/527 |
| 4,434,774 | 3/1984 | Horiuchi | 123/525 |
| 4,453,523 | 6/1984 | Poehlman | 123/525 |
| 4,574,763 | 3/1986 | Hallberg | 123/527 |
| 5,070,850 | 12/1991 | Davis et al. | 123/527 |
| 5,076,245 | 12/1991 | Jones | 123/527 |

FOREIGN PATENT DOCUMENTS 3336021 4/1985 Fed. Rep. of Germany ...... 123/525

*Primary Examiner*—E. Rollins Cross
*Assistant Examiner*—Erick Solis
*Attorney, Agent, or Firm*—Donald D. Mon

[57] ABSTRACT

A fuel lock/converter having an integrated housing with a liquid fuel inlet port and a gaseous fuel outlet port. The outlet port discharges to an air/fuel mixer which acts as a carburetor and its demand controls this fuel lock/converter. Between the inlet port and the outlet port there is a fuel lock which closes in the absence of demand, and opens at any demand. A primary regulator valve regulates liquid flow to a converter, and gaseous fuel from the converter is regulated by a secondary regulator valve. The secondary regulator valve also acts as a fuel lock in the absence of demand.

5 Claims, 2 Drawing Sheets

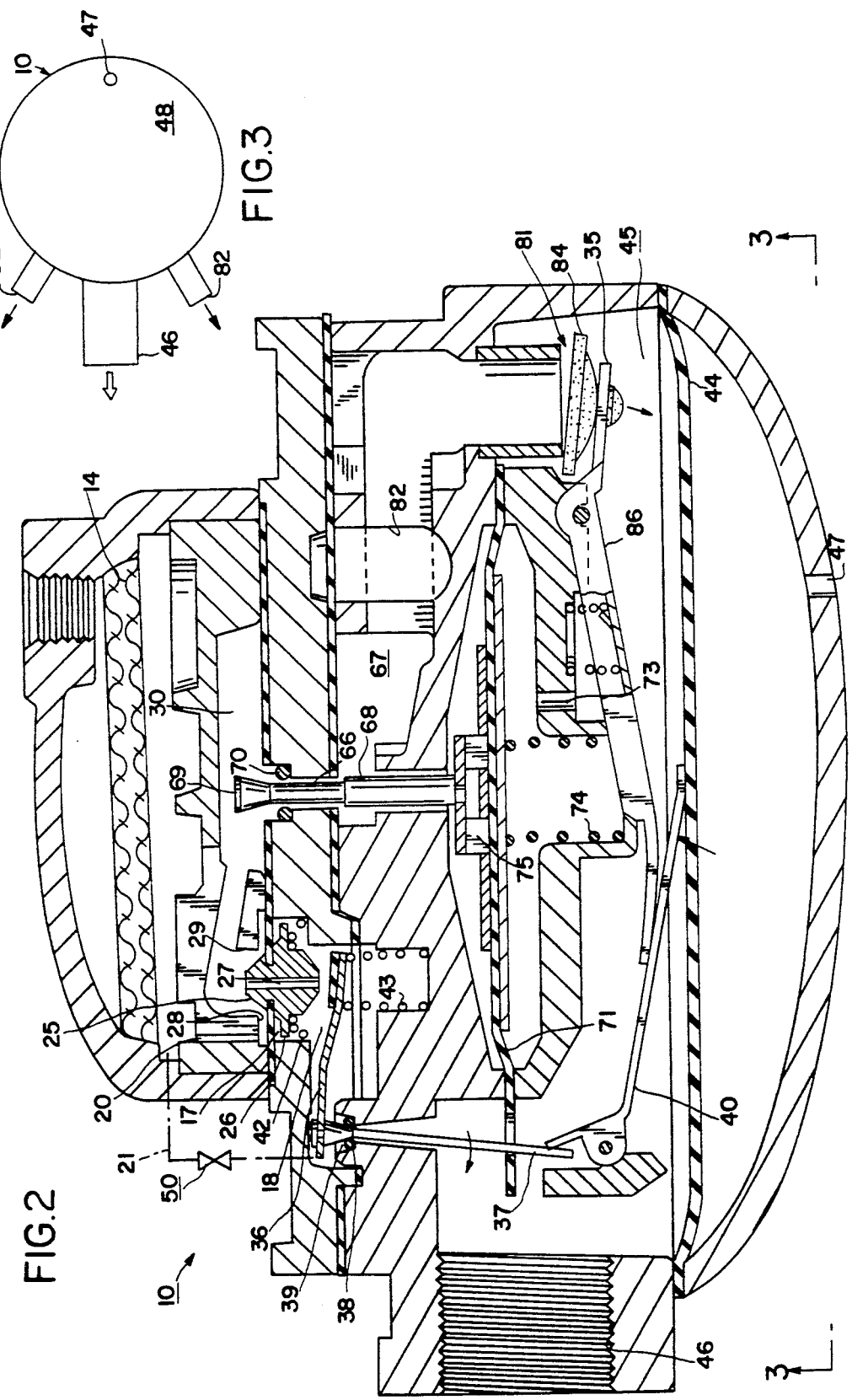

LOW HEIGHT LIQUID FUEL LOCK AND CONVERTER TO THE GASEOUS PHASE

FIELD OF THE INVENTION

This invention relates to a combined fuel lock and converter for converting liquified fuel to the gas phase and supplying it to an internal combustion engine.

BACKGROUND OF THE INVENTION

Fuel gases are regularly supplied to internal combustion engines from pressurized bottles that maintain the fuel in the liquid phase. They are contained at a considerable pressure, and it is necessary to provide a positive lock to prevent fluid flow, including leakage into the system, while the engine is shut down. Another requirement is to convert the fuel from the liquid phase into the gaseous phase at a rate sufficient to supply the engine's demands. These are established and well-known objectives, and fuel locks and converters are available in a wide range of concepts and constructions.

However, it is general practice to provide these devices separately, and to connect them to the engine and to each other by various conduits and linkages. These have the disadvantages of potential for leakage, wear, and malfunction, and also constitute a substantial bulk which must somehow with its accessories be placed under a hood or in some other limited region. To install a plurality of such devices requires interconnecting and fitting the components into whatever space is available. Attempts to integrate these devices have generally been unsuccessful because they have been too bulky, and especially too tall to place in a convenient location under the hood and atop the engine.

It is an object of this invention to provide a unitary fuel lock and liquid fuel converter which not only has an importantly lesser head height and does not require external connections between its parts, but also provides a secondary fuel lock for additional security.

BRIEF DESCRIPTION OF THE INVENTION

The fuel lock/converter of this invention has an integrated housing with a liquid fuel inlet port and a gaseous fuel outlet port. When installed, the outlet port discharges to an air/fuel mixer that acts as a carburetor. The mixer's demand controls this fuel lock/converter.

A pilot chamber is divided by a lock diaphragm into a first region and a second region. The inlet port is is connected by branch conduits to the pilot chamber on both sides of the lock diaphragm.

A regulator chamber communicates with the first region of the pilot chamber on one side of the lock diaphragm. A lock seat faces into the pilot chamber, and surrounds a first passage which intercommunicates the first region of the pilot chamber and the regulator chamber when it is open. The lock diaphragm is adapted to close on the lock seat to prevent flow to the regulator chamber from the first region of the pilot chamber on the same side of the lock diaphragm.

A first orifice passage through the diaphragm, interconnecting the second region of the pilot chamber to the regulator chamber when it is open.

A second orifice is disposed in the other branch which leads to the second region. Each orifice has a respective flow cross-section. The cross-section of the first orifice is substantially larger than the cross-section of the second orifice.

The fuel lock further includes a pivotally-mounted pilot valve plate adapted to open and close the first orifice. It is spring-loaded to the normally closed position against the first orifice.

According to a feature of this invention the valve plate is pivotally mounted to the housing by a resilient ring, and includes a lever responsive to engine demand. It will open the first orifice and let it remain open at any engine demand, and will reliably close it when there is no demand. The difference in cross-section areas of the orifice assures an operative differential pressure when the fuel lock is open to flow.

A primary regulator valve responsive to engine demand functions to provide a sufficient flow of liquid fuel at a reduced, regulated, pressure to a vaporizer which will in turn provide gaseous fuel to a secondary regulator valve which is also responsive to engine demand. The secondary regulator valve also functions to close the system to flow of fuel when there is no demand.

The above and other features of this invention will be fully understood from the following detailed description and the accompanying drawings, in which:

BRIEF DESCRIPTION OF THE DRAWINGS

FIG. 2 shows the fuel lock/converter in operation, supplying gaseous fuel to an engine; and FIG. 3 is a bottom view taken at line 3—3 in FIG. 2.

DETAILED DESCRIPTION OF THE INVENTION

Figure 1:
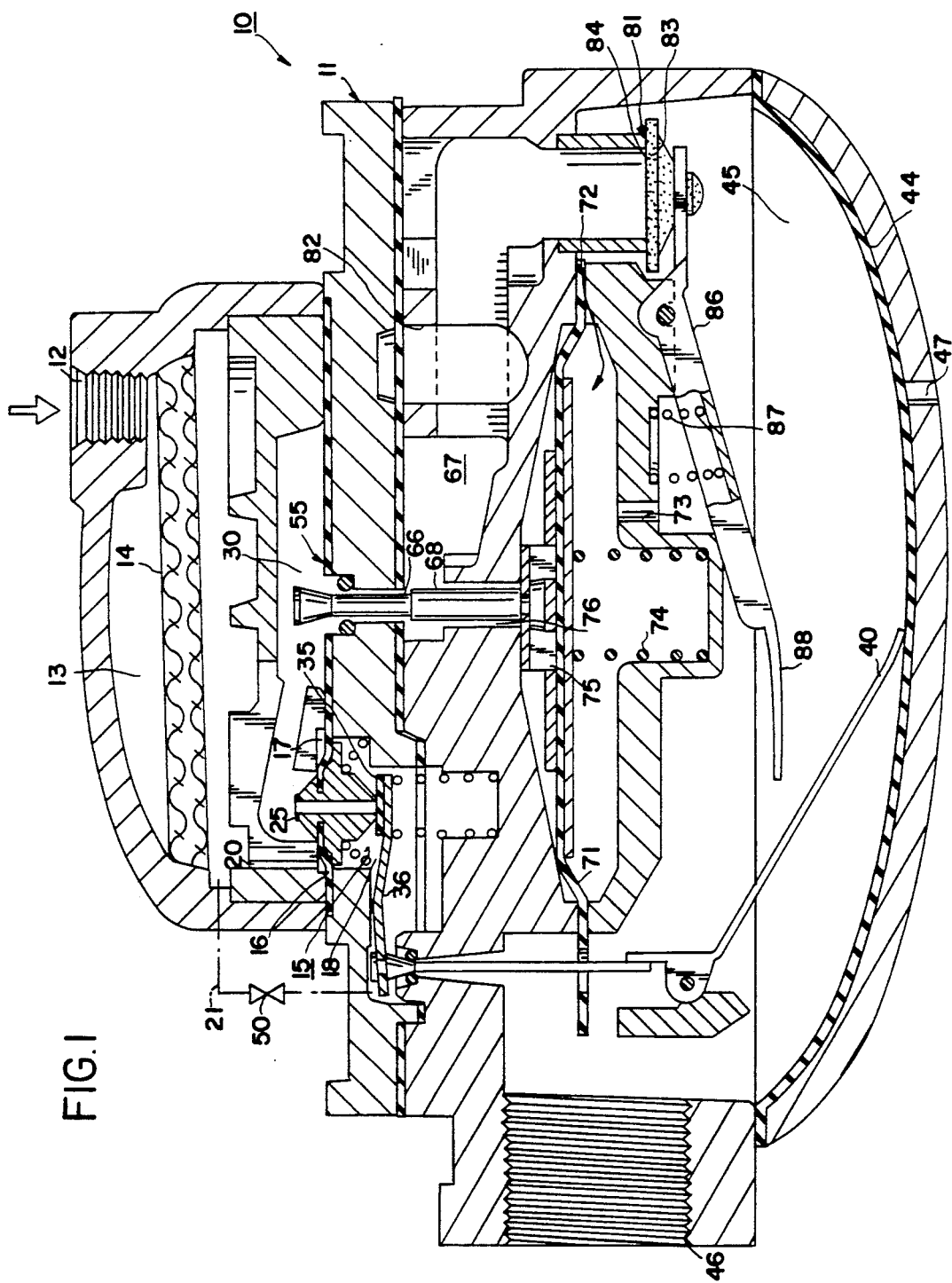
FIG. 1 is an axial cross-section, partly in cutaway cross-section, showing the fuel lock/vaporizer according to the invention in its rest condition.

A fuel lock/converter 10 according to this invention has a housing 11. The housing is formed of a number of structural parts which are held together as an integrated structure by fasteners (not shown). Persons skilled in this art will recognize that most of these parts will be castings designed to take advantage of the economies of the casting process. They will also recognize that the precise locations of various passages may be different from those shown in the drawings.

The housing has a liquid fuel inlet port 12 which extends through a filter chamber 13 in which a porous filter pad 14 is placed.

A pilot chamber 15 below the filter chamber is divided by a flexible lock diaphragm 16. A first region 17 of the pilot chamber is above the diaphragm in the drawings, and a second region 18 of the pilot chamber is below it.

A first branch 20 of the inlet port extends from the filter chamber to first region 17. A second branch 21 of the inlet port extends from the filter chamber to second region 18. Thus, both regions are always open to receive liquid fuel from the inlet port.

A rigid insert 25 is fitted into an opening through lock diaphragm 16. The insert has a backing shoulder 26 to reinforce the diaphragm at its center. A first orifice 27 extends through the insert from the second region 18.

A lock seat 28 faces the diaphragm, and the diaphragm can seat on it to prevent flow across the seat. The seat surrounds a passage 29 that opens into a regulator chamber 30. When first orifice 27 is open, it intercommunicates second region 18 of the pilot chamber to the regulator chamber, in effect to permit flow of fuel through second branch 21 to regulator chamber 30.

Flow of fuel through first branch 20 through the first region 17, past the lock seat through passage 29 and to regulator chamber 30 is enabled when the diaphragm moves downwardly away from the lock seat. It is prevented when the lock diaphragm bears against the lock seat.

A pilot valve seal 35 is attached to a lever 36. Lever 36 includes an arm 37 and a pivot 38. This pivot is quite unique. It is a flexible O-ring in a socket 39. The arm is held in it, and can be deflected by an actuator 40 so as to tilt the lever and move seal 35 away from the first orifice to open it.

Bias spring 42 biases the insert toward the valve-closed condition. Bias spring 43 biases the lever to press the seal against the insert to close the first orifice.

The actuator is responsive to the reduced pressures created by engine demand. A diaphragm 44 exposed on one side to the atmosphere through a passage 47 through cover 48 leaves the lever in the closed condition shown in FIG. 1 in the absence of a sufficient negative pressure in the outlet chamber 45. Outlet port 46 is intended to be connected to the air/fuel mixer of an engine.

A second orifice 50 is fitted in second branch 21. Flow of fuel through this second branch is limited by this second orifice. Each orifice has a flow cross-section. It is important that the cross-section of first orifice 27 be significantly larger than that of second orifice 50, for reasons which will later be appreciated.

A primary regulator valve 55 has a flow passage 66 that extends from the regulator chamber to a vaporizer chamber 67. The regulator valve includes a stem 68 with a tapered head 69 and a seal 70. The rate of flow past seal 70 is determined by the axial placement of the stem in the passage. When the lock valve is open, inlet pressure will exist in the regulator chamber. When it is closed, it will have reduced to atmospheric pressure.

The axial placement of the stem is determined by the condition of a diaphragm 71. A bias chamber 72 is divided by this diaphragm. Beneath it, demand pressure is exerted through a bias port 73 that opens into the discharge chamber. Above it, it receives pressure passed by the regulator valve itself via a clearance 76. Spring bias means 74 and 75 bias the stem upwardly toward the valve-opened condition shown in FIG. 1 and acts as a regulator spring.

Vaporizer chamber 67 extends through the housing to a secondary regulator valve 81. The housing is provided with channels 82 to receive heat from heated fluid such as radiator coolant for vaporizing liquid fuel in the vaporizing chamber. The vaporizing chamber and channels 82 are in heat exchange relationship with one another. The housing is provided with inlet and outlet fittings for this coolant.

The vaporizer chamber exits to a secondary regulator valve 81, which has a valve seat 83 at its termination. A valve seal 84 is adapted to close valve 81. It is attached to valve plate 85 on actuator 86. Bias spring 87 biases the valve seal to the illustrated closed portion. Actuator 86 has an arm 88 that underlays arm 88 of actuator 40. Both actuators are thereby responsive to movement of diaphragm 44, and to the engine demand.

Note that when valve 81 is closed, it constitutes a second fuel lock.

The operation of this device will be understood from the conditions shown in FIGS. 1 and 2. The closed and locked condition is shown in FIG. 1, where there is no engine demand. At this time diaphragm 44 is exposed on both sides to atmosphere and does not displace either actuator.

Pilot valve seal 35 closes the first orifice. The regulator chamber has bled to a low pressure, usually atmospheric. Tank pressure is exerted in second lower region 18 of the pilot chamber, and this provides a net shut-off differential pressure which presses lock diaphragm 16 against lock seat 28. Thus the lock valve is tightly closed.

Further the secondary regulator valve 81 is closed by virtue of its spring bias. This acts as a secondary fuel lock. The fuel lock/converter is completely and reliably closed to flow.

Full operation is shown in FIG. 2. The diaphragm has now pressed both actuators. Actually it has pressed actuator 36 against actuator 44. This opens secondary regulator valve as a function of engine demand. The primary regulator valve has adjusted in response to engine demand to deliver liquid fuel at a regulator pressure usually about 3 psv, as has the secondary regulator valve.

Sufficient demand pressure has been exerted to move diaphragm 44 to tilt lever 36. This moves valve seal 35 away from the first orifice. Now an interesting situation occurs. Because the first orifice is larger that the second orifice, fluid can pass through it faster. However, this flow is limited by the rate established by the second, smaller orifice. Accordingly, the pressure in the second region of the pilot chamber decreases relative to the pressure in the first region. As a consequence the diaphragm in response to fuel inlet pressure moves down and opens the lock valve to flow. This will continue so long as the valve seal is removed from the first orifice.

When demand ceases, the lock valve and the secondary regulator will have closed. The device will then again be in the condition shown in FIG. 1.

A device capable of supplying gaseous fluid to engines up to about 170 HP can be configured into a housing less than 4 inches tall and about 6 inches in diameter. A device of this type can readily fit under a hood or in other restricted areas, all located very closely to the engine, without interlinkages, and with only in minimal hose connections, and no external linkages.

This invention is not to be limited by the embodiment shown in the drawings and described in the description, which is given by way of example, and not of limitation, but only in accordance with the scope of the appended claims.

I claim:

1. A fuel lock/converter for providing a gaseous fuel in response to an engine demand, converting said fuel from the liquid phase, and providing a lock against fuel flow or leakage when no engine demand exists, said fuel lock/converter comprising:

an integrated housing having a liquid fuel inlet port and a gaseous fuel outlet port, said inlet port being adapted for connection to a supply of liquid fuel, said outlet port being adapted for connection to an engine, and thereby to a demand for gaseous fuel;

a pilot chamber in said housing, a flexible lock diaphragm dividing said pilot chamber into a first region and a second region, a lock seat in said first region so disposed and arranged as to be closed by said lock diaphragm in one position of said lock diaphragm, and opened in another position of said lock diaphragm;

a first branch of said inlet port opening into said first region;

a second branch of said inlet port opening into said second region;

a first orifice in said lock diaphragm aligned with said lock seat, and a second orifice through said second branch, the flow cross-section of the first orifice being larger than the flow cross-section of the second orifice;

a pilot valve plate pivotally mounted adjacent to the lock diaphragm, a lock valve seal on said pilot valve plate adapted to close said first orifice in one position thereof, and to be moved away to open it, said valve plate being mounted to a lever, said lever being pivotally mounted to said housing by a flexible O-ring which permits rocking movement of said valve plate and lever;

an actuator responsive to engine demand linked to said lever to move said valve seal away from said first orifice when an engine demand exists;

a regulator chamber in said housing downstream from said lock seat;

a vaporizer chamber downstream from said regulator chamber, and means for heating said vaporizer chamber;

a primary regulator valve interconnecting said regulator chamber and vaporizer chambers, said primary regulator valve being responsive to engine demand to provide a sufficient supply of liquid fuel to said vaporizer chamber at a reduced and regulated pressure;

a secondary regulator valve downstream from, and receiving gaseous fuel from said vaporizer chamber, said secondary regulator valve having a valve seat and an actuator, a valve seal on said actuator adapted to bear against and close said valve seat when no engine demand exists, and to move away from said seat when sufficient demand exists, whereby when no engine demand exists, both the lock valve and the secondary regulator valve are closed to flow, and both are open when sufficient demand exists.

2. A fuel lock/vaporizer according to claim 1 in which both of said actuators respond to an actuator diaphragm.

3. A fuel lock/vaporizer according to claim 2 in which the actuator for the fuel lock valve overlaps the actuator for the secondary regulator so the fuel lock valve opens before the secondary regulator valve opens.

4. A fuel lock/vaporizer according to claim 1 in which a filter chamber is formed in the inlet port upstream of said branches, and filter means is placed therein to filter the liquid fuel that flows therethrough.

5. A fuel lock/vaporizer according to claim 1 in which the pilot chamber and regulator chamber are disposed adjacent to one another and atop the vaporizer chamber, and in which the regulator actuator lies in a discharge chamber connected to said outlet port.

* * * * *